(12) United States Patent
Mueller et al.

(10) Patent No.: US 11,336,070 B2
(45) Date of Patent: *May 17, 2022

(54) CONDUCTIVELY-COOLED SLAB LASER

(71) Applicant: Coherent, Inc., Santa Clara, CA (US)

(72) Inventors: Eric R. Mueller, West Suffield, CT (US); Vernon A. Seguin, Windsor, CT (US); Christian Shackleton, Granby, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,564

(22) Filed: Apr. 2, 2020

(65) Prior Publication Data

US 2020/0235542 A1 Jul. 23, 2020

Related U.S. Application Data

(63) Continuation of application No. 15/914,343, filed on Mar. 7, 2018, now Pat. No. 10,644,474.

(51) Int. Cl.
*H01S 3/041* (2006.01)
*H01S 3/038* (2006.01)
(Continued)

(52) U.S. Cl.
CPC ............ *H01S 3/041* (2013.01); *H01S 3/0305* (2013.01); *H01S 3/0315* (2013.01);
(Continued)

(58) Field of Classification Search
CPC ......... H01S 3/0315; H01S 3/032–0323; H01S 3/0381; H01S 3/0382; H01S 3/0385; H01S 3/0407; H01S 3/041
See application file for complete search history.

(56) References Cited

U.S. PATENT DOCUMENTS 3,921,097 A * 11/1975 Caristi .................... H01S 3/038
372/83
4,493,087 A * 1/1985 Laakman .............. H01S 3/0315
372/38.05
(Continued)

FOREIGN PATENT DOCUMENTS

| CN | 102273026 A | * | 12/2011 | ........... H01S 3/0315 |
| DE | 20221394 U1 | * | 10/2005 | ........... H01S 3/0323 |
| WO | 2009/001395 A1 | | 12/2008 | |

OTHER PUBLICATIONS

International Search Report and Written Opinion received for PCT Patent Application No. PCT/US2019/020375, dated Jun. 17, 2019, 16 pages.

(Continued)

*Primary Examiner* — Joshua King
(74) *Attorney, Agent, or Firm* — Morrison & Foerster LLP

(57) ABSTRACT

A carbon dioxide gas-discharge slab-laser is assembled in a laser-housing. The laser-housing is formed from a hollow extrusion. An interior surface of the extrusion provides a ground electrode of the laser. Another live electrode is located within the extrusion, electrically insulated from and parallel to the ground electrode, forming a discharge-gap of the slab-laser. The electrodes are spaced apart by parallel ceramic strips. Neither the extrusion, nor the live electrode, include fluid coolant channels. The laser-housing is cooled by fluid-cooled plates attached to the outside thereof.

12 Claims, 6 Drawing Sheets

(51) Int. Cl.
*H01S 3/03* (2006.01)
*H01S 3/223* (2006.01)
*H01S 3/04* (2006.01)

(52) U.S. Cl.
CPC .......... *H01S 3/0385* (2013.01); *H01S 3/0404* (2013.01); *H01S 3/0405* (2013.01); *H01S 3/0407* (2013.01); *H01S 3/2232* (2013.01)

(56) References Cited

U.S. PATENT DOCUMENTS

| | | | | |
|---|---|---|---|---|
| 4,577,323 A * | 3/1986 | Newman | H01S 3/0975 | 372/64 |
| 4,719,639 A * | 1/1988 | Tulip | H01S 3/0315 | 372/35 |
| 4,761,787 A * | 8/1988 | Heynisch | H01S 3/0315 | 372/34 |
| 4,787,090 A * | 11/1988 | Newman | H01S 3/0315 | 372/35 |
| 4,807,232 A * | 2/1989 | Hart | H01S 3/0315 | 372/18 |
| 4,908,585 A * | 3/1990 | Chenausky | H01F 19/04 | 333/219 |
| 5,079,773 A * | 1/1992 | Hart | H01S 3/2383 | 372/18 |
| 5,088,102 A * | 2/1992 | Krueger | H01S 3/0388 | 372/59 |
| 5,123,028 A | 6/1992 | Hobart et al. | | |
| 5,127,017 A * | 6/1992 | Krueger | H01S 3/0315 | 372/61 |
| 5,216,689 A * | 6/1993 | Gardner | H01S 3/0315 | 372/103 |
| 5,373,528 A * | 12/1994 | Kuzumoto | H01S 3/0315 | 372/35 |
| 5,386,431 A * | 1/1995 | Tulip | H01S 3/0315 | 359/346 |
| 5,436,926 A * | 7/1995 | Laakmann | H01S 3/0315 | 372/65 |
| 5,475,703 A * | 12/1995 | Scalise | H01S 3/0315 | 372/82 |
| 5,600,668 A * | 2/1997 | Erichsen | H01S 3/0315 | 372/34 |
| 5,881,087 A * | 3/1999 | Sukhman | H01S 3/0315 | 372/61 |
| 6,192,061 B1 * | 2/2001 | Hart | H01S 3/0315 | 372/107 |
| 6,195,379 B1 * | 2/2001 | Jones | H01S 3/0315 | 372/64 |
| 6,198,758 B1 * | 3/2001 | Broderick | H01S 3/041 | 372/34 |
| 6,198,759 B1 * | 3/2001 | Broderick | H01S 3/0315 | 372/39 |
| 6,229,837 B1 * | 5/2001 | Ozu | H01S 3/031 | 372/38.05 |
| 6,256,332 B1 * | 7/2001 | Anikitchev | H01S 3/0315 | 372/93 |
| 6,370,178 B1 * | 4/2002 | Papayoanou | H01S 3/0315 | 372/107 |
| 6,442,186 B1 * | 8/2002 | Vitruk | H01S 3/0315 | 372/23 |
| 6,788,722 B1 * | 9/2004 | Kennedy | H01S 3/0315 | 372/55 |
| 6,879,616 B2 * | 4/2005 | Deile | H01S 3/0385 | 372/55 |
| 6,983,001 B2 * | 1/2006 | Sukhman | H01S 3/03 | 372/34 |
| 6,999,490 B2 * | 2/2006 | Kennedy | H01S 3/0315 | 372/55 |
| 7,046,709 B2 | 5/2006 | Seguin et al. | | |
| 7,260,134 B2 * | 8/2007 | Shackleton | H01S 3/0315 | 372/55 |
| 7,263,116 B2 * | 8/2007 | Shackleton | H01S 3/0315 | 372/55 |
| 7,570,683 B1 * | 8/2009 | Broderick | H01S 3/03 | 372/35 |
| 7,970,038 B2 * | 6/2011 | Shackleton | H01S 3/2232 | 372/61 |
| 8,611,391 B2 * | 12/2013 | DeMaria | H01S 3/0385 | 372/61 |
| 8,942,270 B2 * | 1/2015 | DeMaria | H01S 3/041 | 372/55 |
| 9,197,028 B2 * | 11/2015 | Bethel | H01S 3/0315 | |
| 9,263,844 B2 * | 2/2016 | Sukhman | H01S 3/041 | |
| 9,419,404 B1 | 8/2016 | Mueller | | |
| 9,614,342 B2 | 4/2017 | Papanide et al. | | |
| 10,644,474 B2 * | 5/2020 | Mueller | H01S 3/2232 | |
| 2002/0075931 A1 * | 6/2002 | Tang | H01S 3/041 | 372/55 |
| 2004/0114647 A1 * | 6/2004 | Sukhman | H01S 3/2232 | 372/36 |
| 2004/0218650 A1 * | 11/2004 | Monty | H01S 3/0315 | 372/64 |
| 2005/0105581 A1 * | 5/2005 | Seguin | H01S 3/0315 | 372/64 |
| 2005/0175054 A1 * | 8/2005 | Shackleton | H01S 3/0315 | 372/55 |
| 2006/0029116 A1 * | 2/2006 | Shackleton | H01S 3/0315 | 372/55 |
| 2007/0189353 A1 * | 8/2007 | Monty | H01S 3/0385 | 372/87 |
| 2007/0195839 A1 * | 8/2007 | Monty | H01S 3/0315 | 372/38.05 |
| 2008/0240183 A1 * | 10/2008 | Newman | H01S 3/2232 | 372/35 |
| 2009/0034574 A1 * | 2/2009 | Shackleton | H01S 3/2232 | 372/61 |
| 2009/0213885 A1 * | 8/2009 | DeMaria | H01S 3/2232 | 372/34 |
| 2010/0172386 A1 * | 7/2010 | Hua | H01S 3/09713 | 372/38.05 |
| 2010/0189156 A1 * | 7/2010 | Clementi | H01S 3/0971 | 372/55 |
| 2011/0182319 A1 * | 7/2011 | Hua | H01S 3/134 | 372/55 |
| 2012/0128022 A1 * | 5/2012 | Morrow | H01S 3/03 | 372/64 |
| 2012/0219028 A1 * | 8/2012 | Morrow | H01S 3/0315 | 372/36 |
| 2012/0281728 A1 * | 11/2012 | DeMaria | H01S 3/038 | 372/55 |
| 2013/0259074 A1 * | 10/2013 | Newman | H01S 3/041 | 372/35 |
| 2014/0334510 A1 * | 11/2014 | Bethel | H01S 3/0315 | 372/38.05 |

OTHER PUBLICATIONS

Non-Final Office Action received for U.S. Appl. No. 15/914,343, dated Jul. 3, 2019, 14 pages.
Notice of Allowance received for U.S. Appl. No. 15/914,343, dated Jan. 16, 2020, 12 pages.

* cited by examiner

CONDUCTIVELY-COOLED SLAB LASER

PRIORITY

This application is a continuation of U.S. patent application Ser. No. 15/914,343, filed Mar. 7, 2018, the disclosure of which is incorporated herein in its entirety.

TECHNICAL FIELD OF THE INVENTION

The present invention relates in general to carbon dioxide ($CO_2$) lasers. The invention relates in particular to pulsed $CO_2$ gas-discharge lasers having a slab configuration.

DISCUSSION OF BACKGROUND ART $CO_2$ lasers have been used for decades in industrial processes, wherein the infrared (IR) wavelength and relatively high power of a $CO_2$ laser is advantageous. The lasing medium in a $CO_2$ laser is a gas-discharge in a gas mixture. The gas mixture typically includes 10% to 20% $CO_2$ and is maintained at less than one atmosphere of pressure. The gas mixture is energized to generate the gas-discharge by applying an electric current or a radio-frequency (RF) field between two electrodes. $CO_2$ lasers can deliver output laser-radiation at infrared wavelengths within a range from about 9 micrometers ($\mu$m) to about 11 $\mu$m. A $CO_2$ laser may be configured as a waveguide-laser or a slab-laser.

In a waveguide $CO_2$ laser, the gas-discharge is established within a long and comparatively narrow waveguide. A laser-resonator is formed around the energized gas mixture by resonator mirrors, located at each end of the waveguide, that direct laser-radiation a longitudinal direction. The narrow waveguide constrains one or more laser-radiation modes in two mutually-orthogonal transverse directions. Laser-radiation is amplified by stimulated emission during multiple passes through the gas-discharge. Such $CO_2$ waveguide-lasers are capable of providing an inherently high-quality output beam, with good power and wavelength stability, but at relatively low average powers. Typically, at an average power less than about 150 Watts (W). Such a waveguide $CO_2$ laser is described in U.S. Pat. Nos. 6,192,061 and 6,788,722, each thereof owned by the assignee of the present invention and the complete disclosure of each is hereby incorporated herein by reference.

In a slab $CO_2$ laser, the gas-discharge is established in a volume between flat wave-guiding surfaces of two closely-spaced electrodes. A laser-resonator is formed around the energized gas mixture by two resonator mirrors. In one transverse direction, the small gap ("discharge-gap") between the two electrodes defines a waveguide that constrains laser-radiation modes. In the orthogonal transverse direction, the resonator mirrors typically define an unstable laser-resonator. Laser-radiation exits the unstable laser-resonator as an approximately collimated beam, passing through a hole in one of the resonator mirrors or passing by an outside edge of one of the resonator mirrors. Such a slab $CO_2$ laser is described in U.S. Pat. Nos. 6,256,332 and 7,263,116, each thereof owned by the assignee of the present invention and the complete disclosure of each is hereby incorporated herein by reference.

Such slab $CO_2$ lasers are capable of delivering an output beam at an average power of up to about 8 kilowatts (kW). However, the output beam inherently has an elongated cross-section. Additional beam-conditioning optics are required to transform the output beam into a more useful cross-sectional shape. For example, a circular shape.

Slab $CO_2$ lasers are usually operated in a pulsed mode, delivering pulses of laser-radiation having high peak powers. In many industrial laser-processes, higher average power translates to higher throughput. Process efficiency justifies a laser cost that scales with average power. Usually, the cost scaling results from a need to provide complex cooling arrangements to cope with waste heat generated when operating at high average power. Typically, a fluid coolant is forced through channels within one or both of the electrodes. Alternatively, air is forced through an array of metal fins that are in direct thermal contact with one or both of the electrodes. Liquid water is a preferred coolant in many applications because water has a comparatively high heat capacity for efficiently removing substantial waste heat and because fluid-cooling generates less acoustic noise than equivalent forced-air cooling.

In recent years, pulsed slab $CO_2$ lasers have been used increasingly in dental applications, including both hard-tissue and soft-tissue operations, where the relatively long IR wavelength permits cutting and coagulation at the same time. The relatively high cost of industrial slab-lasers can be prohibitive for a dental practice, where other surgical alternatives are available, albeit less convenient for the surgeon and often more painful for the patient.

Dental operations using $CO_2$ lasers usually require a relatively high peak power, but this can be at a relatively low duty-cycle, so a high average power has little utility. There is a need for a $CO_2$ slab-laser that can deliver radiation at a high peak power, but at a relatively low average power, thereby eliminating the need for the complex cooling arrangements that increase cost.

SUMMARY OF THE INVENTION

In one aspect, a gas-discharge slab-laser in accordance with the present invention comprises a laser-housing, including an elongated hollow extrusion having an interior surface thereof, forming a first elongated electrode. A second elongated electrode is located within the elongated extrusion. The second elongated electrode is spaced-apart and parallel to the first elongated electrode. The spaced-apart first and second elongated electrodes define a discharge-gap of the slab-laser. Neither the elongated extrusion nor the second elongated electrode include any fluid-cooling means. The first and second elongated electrodes are spaced apart by either first and second elongated ceramic strips, which are laterally-separated and parallel to each other.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
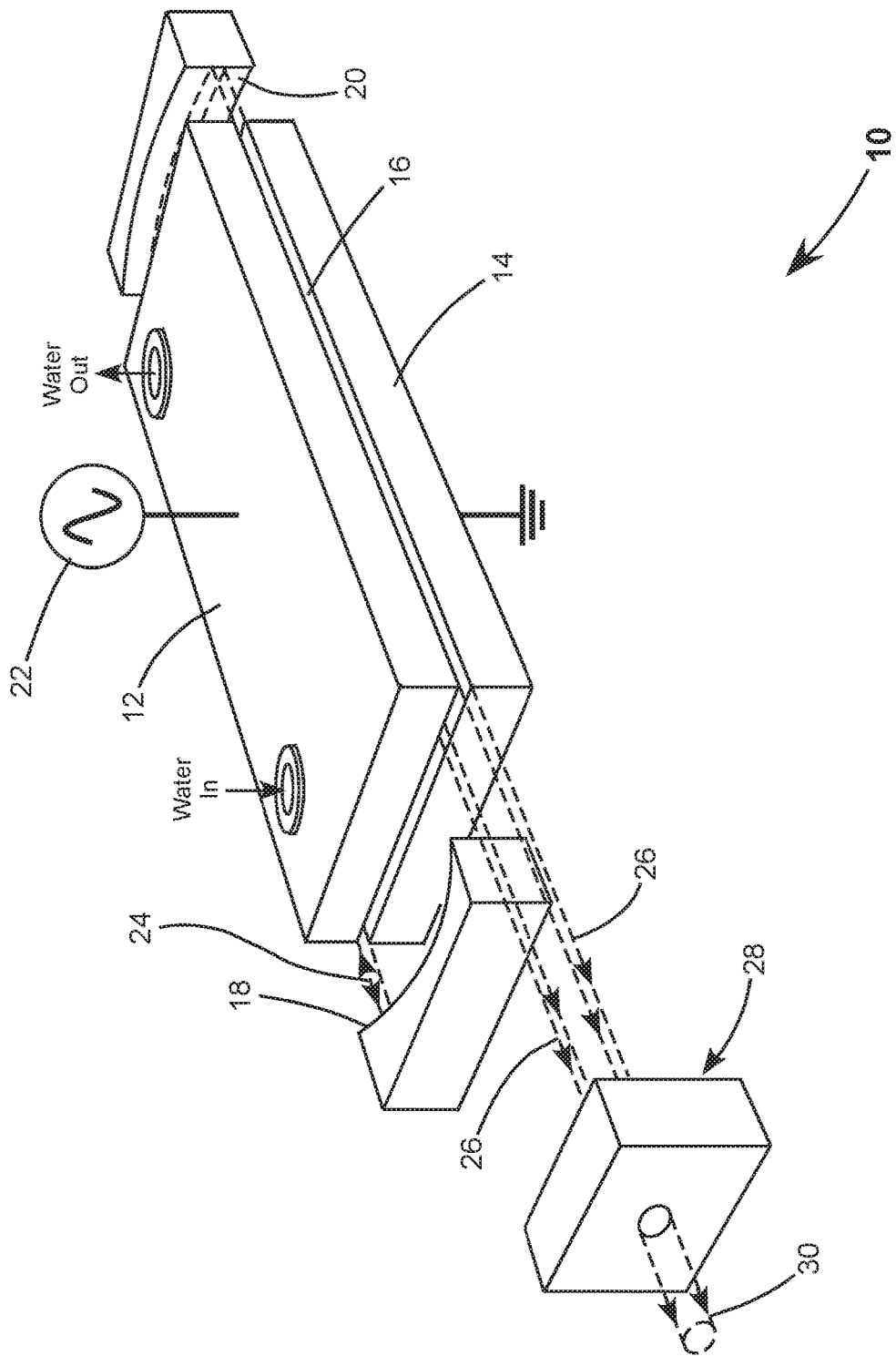
FIG. 1 is a perspective view, schematically illustrating basic features and function of a prior-art $CO_2$ slab-laser.

Turning now to the drawings, wherein like features are designated by like reference numerals, FIG. 1 is a perspective view, schematically illustrating basic features and function of a prior-art $CO_2$ slab-laser 10. Laser 10 includes upper and lower electrodes, 12 and 14 respectively, which each have a rectangular shape. The electrodes are spaced apart and parallel to each other, defining a discharge-gap 16 therebetween. In high-power slab-lasers, particularly multi-kilowatt slab-lasers, it is usual to provide direct fluid-cooling through the electrodes, as indicated in the drawing for upper electrode 12.

Discharge-gap 16 is located in an unstable resonator formed by concave mirrors 18 and 20. An RF power source 22 is electrically connected to upper electrode 12. Lower electrode 14 is grounded. Typically, the electrodes are located within a gas-tight housing (not shown) that contains the gas mixture. Gas mixtures for $CO_2$ discharge lasers are well known in the art. Component gases and pressure may vary according to manufacturer preferences and are usually proprietary.

When RF power is applied to upper electrode 12 to energize the gas mixture, a gas-discharge is struck in discharge-gap 16, thereby providing optical gain in the resonator formed by mirrors 18 and 20. Laser-radiation circulates in the resonator, as indicated by dashed lines 24, and is progressively amplified by optical gain provided by the gas-discharge in discharge-gap 16. The progressively amplified laser-radiation fills mirror 20. A portion thereof spills out of the resonator, past mirror 18, as output laser-radiation indicated by dashed lines 26.

Output laser-radiation 26 is in the form of an expanding beam having a rectangular cross-section. Optionally, beam-conditioning optics 28 may be provided to convert the beam to a more useful form, such as a collimated beam 30 having an about circular cross-section. Beam-conditioning optics are typically located outside the gas-tight housing. Such beam conditioning optics are well-known in the art and a detailed description thereof is not necessary for understanding principles of a $CO_2$ slab-laser.

Figure 2:
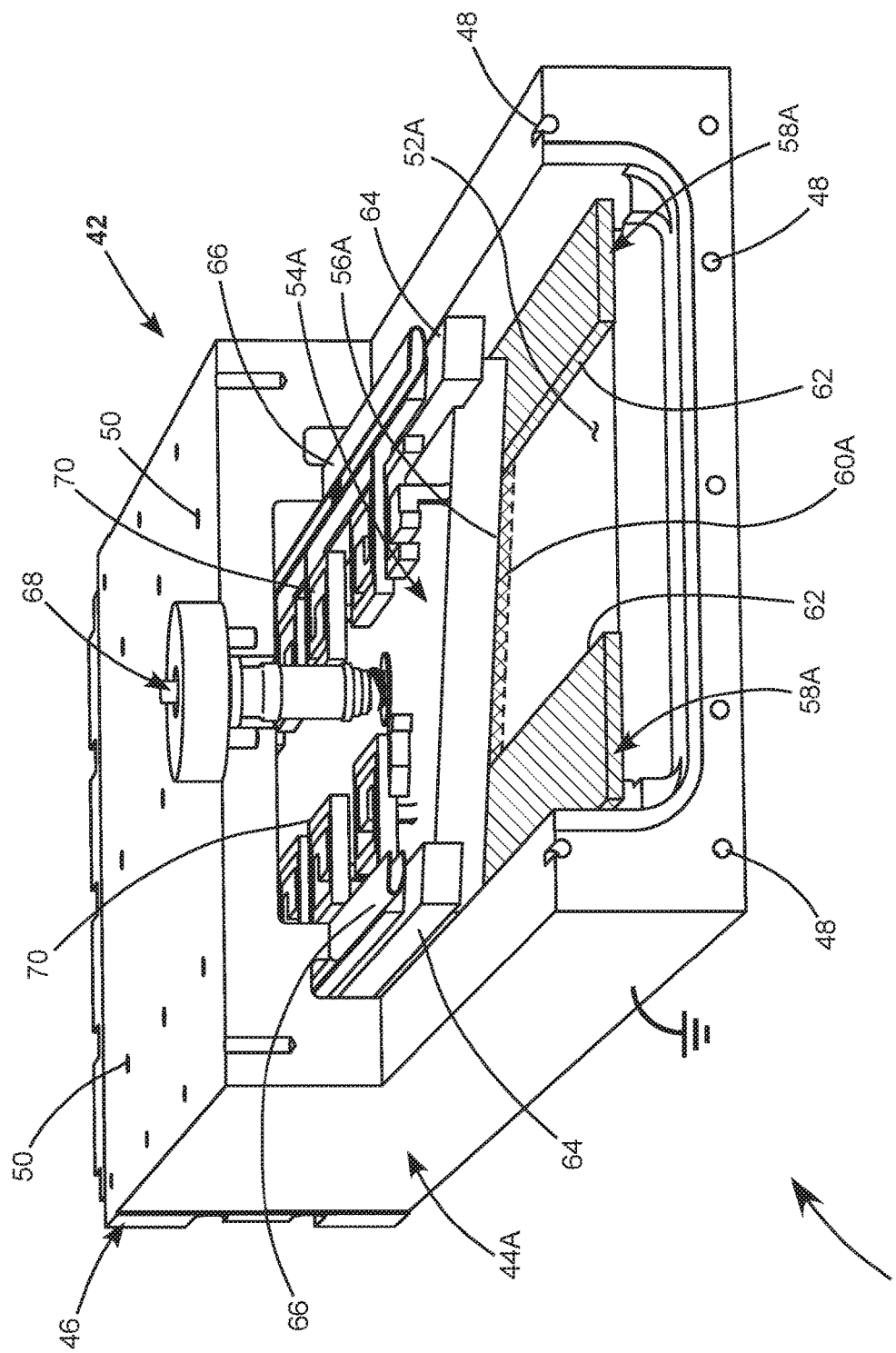
FIG. 2 is a perspective view, partially cut-away, schematically illustrating one preferred embodiment of a $CO_2$ slab-laser in accordance with the present invention, including an elongated hollow extrusion, the extrusion providing a ground electrode for the laser, a live electrode spaced apart from the ground electrode by a pair of elongated ceramic strips, with edges of the ceramic strips defining a width of a discharge-volume of the laser.

FIG. 2 is a perspective view, partially cut away, schematically illustrating one preferred embodiment 40 of $CO_2$ slab-laser in accordance with the present invention. Laser 40 has a gas-tight housing 42, including an elongated hollow extrusion 44A, shown partially cut-away to illustrate internal components and arrangements of the laser. The extrusion is preferentially made of aluminum and is at electrical ground, as depicted in the drawing. An end-plate 46, including one resonator mirror (not visible in the drawing), provides for sealing laser-housing 42 at one end. Screw-holes 48 provide for attaching another end-plate and another resonator-mirror (neither shown), for sealing laser-housing 42 at the opposite end. Additional screw holes 50 provide for attaching an optional cooling-plate, described in detail further hereinbelow.

An interior surface 52A of extrusion 44A provides an elongated ground electrode for the laser, which extends along the length of extrusion 44A. An elongated live electrode 54A having a lower surface 56A is located within extrusion 44A. Live surface 56A is spaced apart from grounded surface 52A by a pair of elongated ceramic strips 58A, which are laterally-separated and parallel to each other. Ceramic strips 58A are preferably made of an electrically-insulating ceramic having a relatively high thermal conductivity. For example, made of aluminum nitride (AlN), aluminum oxide ($Al_2O_3$), or beryllium oxide (BeO). The inventive ceramic strips are highlighted in the drawing by diagonal hatching.

Spaced-apart grounded surface 52A and live surface 56A define a discharge-gap of laser 40. Specifically, the common height of ceramic strips 58A defines the height of a discharge-volume 60A, while edges 62 of ceramic strips 58A constrain the gas-discharge laterally and thus define a width of the discharge-volume. Altogether, the length of live electrode 54A, the discharge-gap, and edges 62 define discharge-volume 60A. The discharge-volume is depicted in cross-section in the drawing and indicated by cross-hatching. Grounded surface 52A and live surface 56A are preferably polished.

A pair of insulator strips 64 electrically isolate live electrode 54A from grounded extrusion 44A. Spring strips 66 provided for retaining live electrode 54A in position within the extrusion. An electrical feed-through 68 is provided for connecting RF-power to live electrode 54A. Feed-through 68 is electrically connected to live electrode 54A and is electrically isolated from grounded extrusion 44A. A plurality of inductors 70 are provided to homogenize the gas-discharge along discharge-volume 60A.

In laser 40, neither grounded extrusion 44A nor live electrode 54A are provided with any internal fluid-cooling means. This avoids expensive and difficult operations to bore holes within the grounded extrusion and the live electrode, then to fit cooling-tubes within the holes. Such boring and fitting operations would otherwise contribute significantly to the manufacturing cost of the laser. Live electrode 54A is conductively cooled, transferring heat to extrusion 44A via ceramic strips 58A.

It should be noted here that only sufficient description of the drawing of FIG. 2 is provided for understanding principles of the present invention. The function of other details of the drawing will be evident to those of ordinary skill in the construction and operation of sealed RF-excited slab-lasers. It should also be noted that while a hollow extrusion allows for efficient and inexpensive fabrication of the inventive slab-laser, the term "extrusion" as used in this description and in the appended claims is understood to include any equivalent mechanical structure. For example, a mechanical structure formed from a plurality of machined components.

Figure 3:
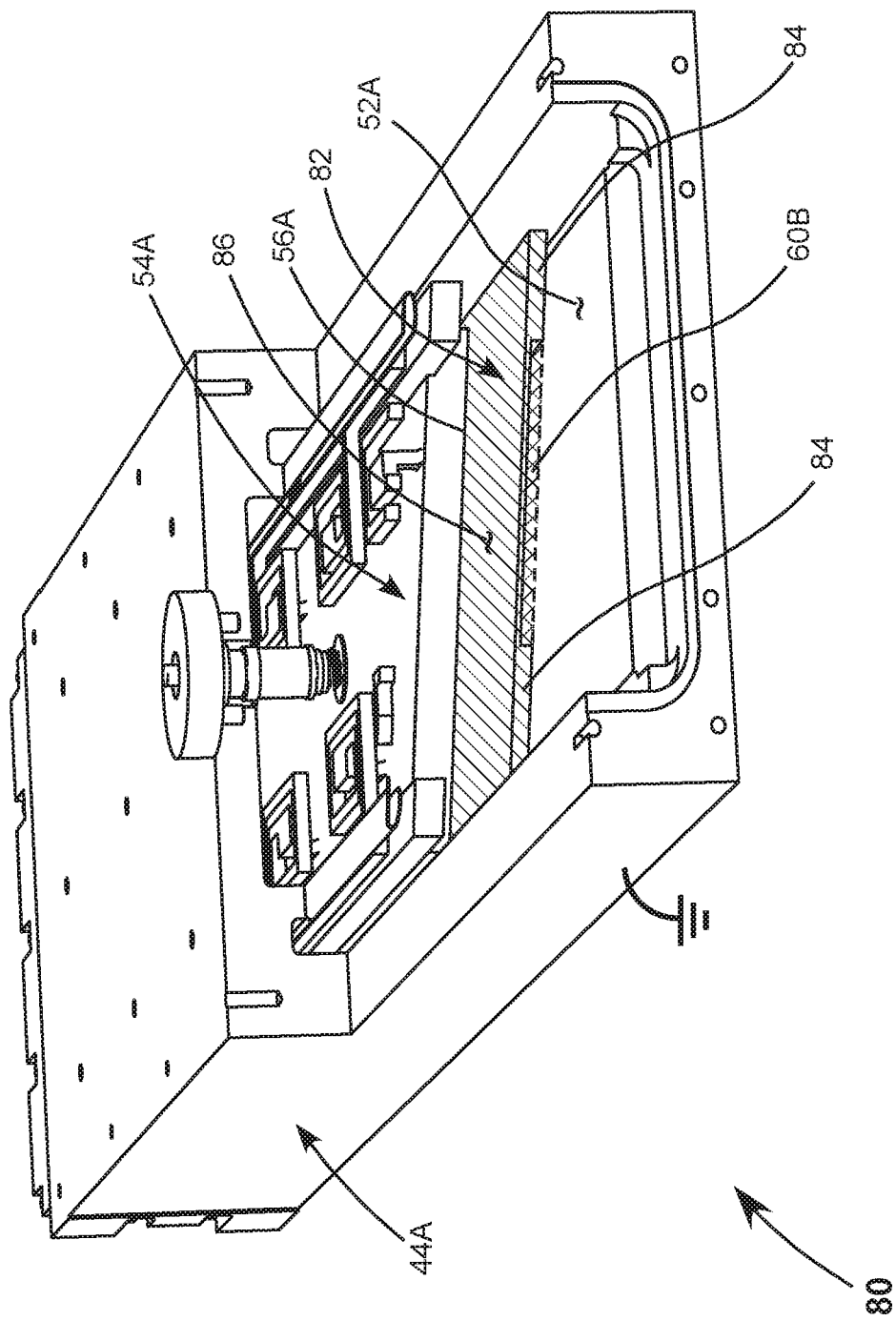
FIG. 3 is a perspective view, partially cut-away, schematically illustrating another preferred embodiment of a $CO_2$ slab-laser in accordance with the present invention, similar to the embodiment of FIG. 2, but having the two electrodes spaced apart by an elongated ceramic member, which has parallel raised edges extending therealong, the raised edges defining a width of a discharge-volume of the laser.

FIG. 3 is a perspective view, partially cut-away, schematically illustrating another preferred embodiment 80 of a $CO_2$ slab-laser in accordance with the present invention. Laser 80 is similar laser 40 of FIG. 2, except for the manner in which grounded surface 52A and live surface 56A are spaced apart. Extrusion 44A of laser 80 is configured identically with extrusion 44A of laser 40 and live electrodes 54A is also identically configured. Accordingly, only sufficient reference numerals are provided in FIG. 3 to describe the different spacing arrangements.

In laser 80, surfaces 52A and 56A are spaced apart by an elongated ceramic member 82 having two parallel raised edges 84. A hollow between ceramic member 82 and grounded surface 52A formed by raised edges 84 defines a discharge-volume 60B. A discharge-gap is defined by the common height of the raised edges. A width of the discharge-volume is defined by the separation between the raised edges. Using ceramic member 82 in place of the pair of separate ceramic strips of laser 40 eliminates need to separately insert the ceramic strips and establish parallelism thereof.

Surface 86 of ceramic member 82 is depicted in FIG. 3 as being in contact with live surface 56A of live electrode 54A. However, ceramic member 82 will function similarly with surface 86 thereof in contact with grounded surface 52A of extrusion 44A. A hollow between ceramic member 82 and live surface 56A formed by raised edges 84 will then define the discharge-volume in this arrangement.

Figure 4:
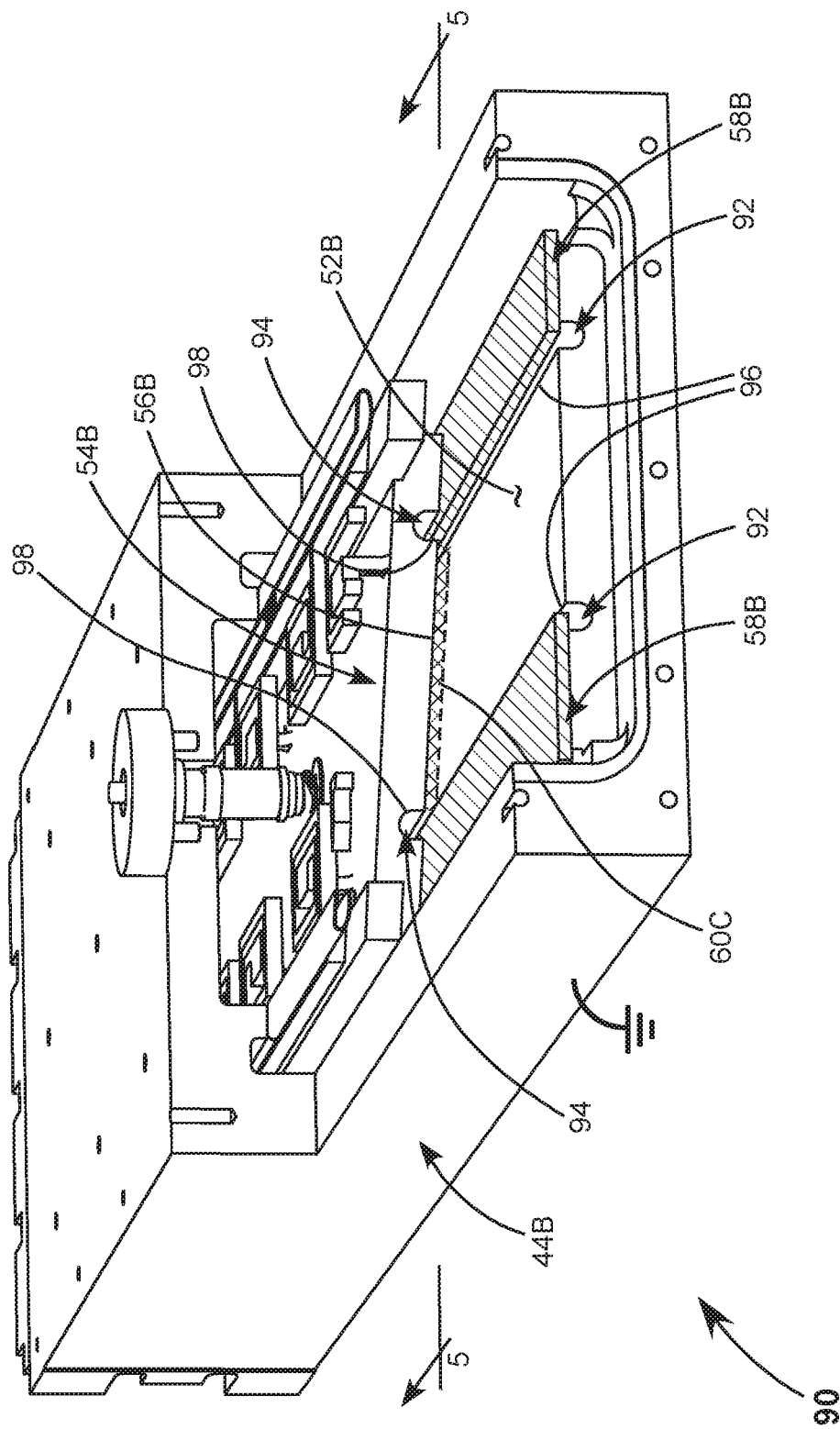
FIG. 4 is a perspective view, partially cut-away, schematically illustrating yet another preferred embodiment of a $CO_2$ slab-laser in accordance with the present invention, similar to the embodiment of FIG. 2, but wherein a width of a discharge-volume is defined by mutually-separated and parallel grooves extending along the ground electrode.

FIG. 4 is a perspective view, partially cut-away, schematically illustrating yet another preferred embodiment 90 of a $CO_2$ slab-laser in accordance with the present invention. Laser 90 is similar to laser 40 of FIG. 2, except for the manner in which edges of a discharge-volume 60C are defined. Accordingly, only sufficient reference numerals are provided in FIG. 4 to describe these differences.

In laser 90, extrusion 44B includes a pair of grooves or troughs 92 extending therealong, which are mutually-separated and parallel to each other. Between grooves 92 is a surface 52B, which provides an elongated ground electrode for the laser. A pair of corresponding grooves 94 in elongated live electrode 54B are aligned with grooves 92 in extrusion 44B. Between grooves 94 is a surface 56B of live electrode 54B.

Ceramic strips 58B are narrower than corresponding ceramic strips 58A of laser 40, such that they do not completely cover grooves 92 and 94. Accordingly, in laser 90, the width of discharge-volume 60C is defined by edges 96 of grooves 92 and edges 98 of grooves 94. A discharge-gap is the defined by the distance between grounded surface 52B and live surface 56B. This arrangement prevents contact between the ceramic spacers and the gas-discharge, thereby avoiding possible erosion of the ceramic spacers by the gas-discharge.

A variation (not shown) of laser 90 is possible wherein separate ceramic strips 58B are replaced with a single ceramic member similar to ceramic member 82 of laser 80. In this variation, the raised edges of the ceramic member are spaced-apart such that the width of discharge-volume 60C is defined by edges 96 of grooves 92 or edges 98 of grooves 94, as in laser 90.

Figure 5:
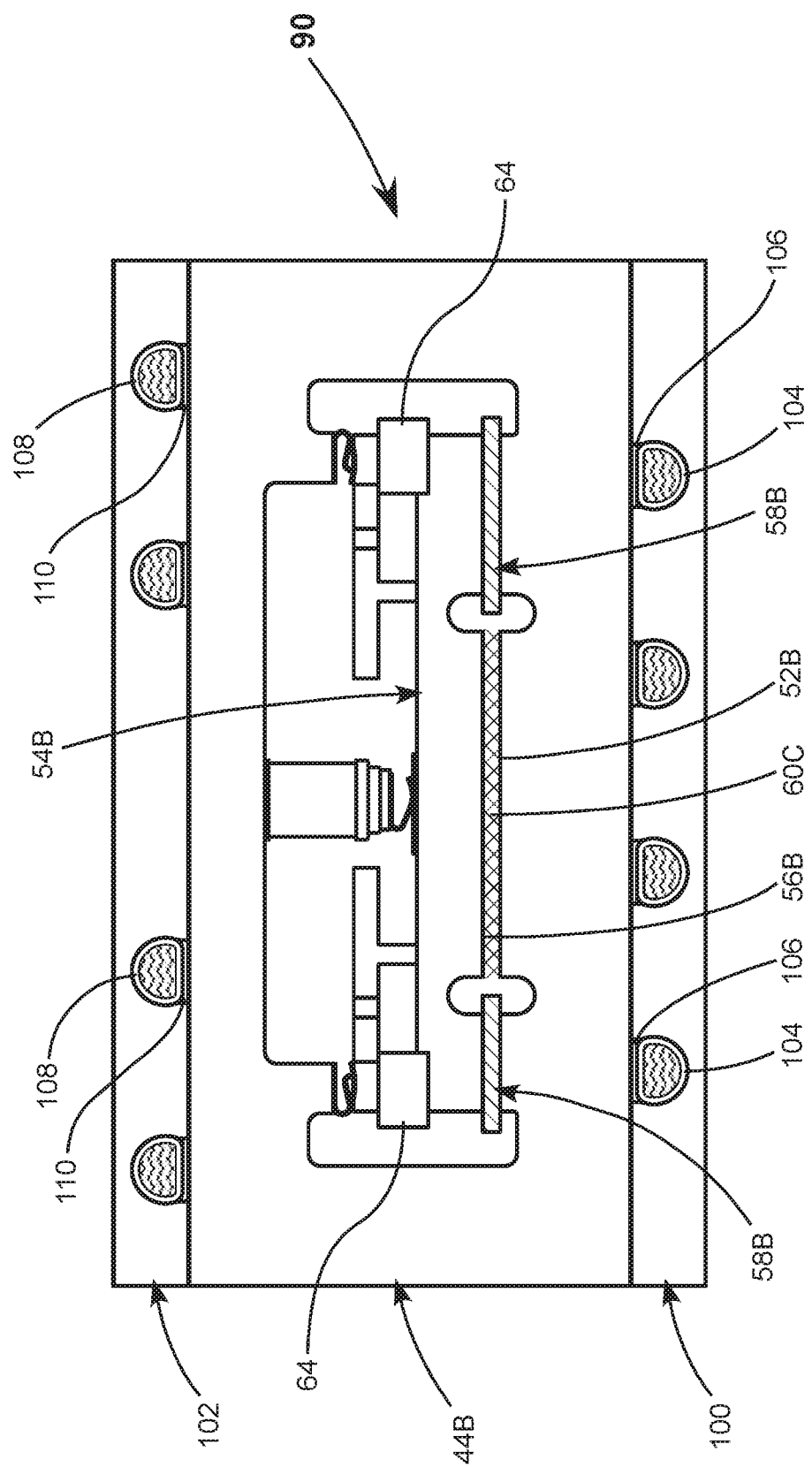
FIG. 5 is a cross-section view, seen generally in the direction 5-5 of FIG. 4, schematically illustrating fluid-cooled cooling-plates attached to upper and lower exterior surfaces of the elongated extrusion.

FIG. 5 is a cross-sectional view, seen generally in the direction 5-5 of FIG. 4, schematically illustrating two fluid-cooled cooling-plates 100 and 102 attached to respectively lower and upper exterior surfaces of extrusion 44B of laser 90. Cooling-plate 100 includes a cooling-fluid conduit 104 having a D-shaped cross-section pressed into a U-shaped groove 106. Conduit 104 is preferably continuous, arranged in a serpentine fashion over an area to be cooled. Cooling plate 100 is located adjacent to surface 52B, which is the ground electrode. Cooling-plate 102 includes a cooling-fluid conduit 108 having a D-shaped cross-section pressed into a U-shaped groove 110. Conduit 108 is also preferably a continuous and arranged in a serpentine fashion. Cooling-plate 102 provides additional cooling of extrusion 44B.

A common cooling fluid is water, often with additives to prevent corrosion and freezing. An advantage of using separate cooling-plates rather than providing direct fluid-cooling within extrusion 44B is that is fabricating cooling-plates 100 and 102 is much simpler that machining a similar serpentine cooling path within extrusion 44B. Further, should any corrosion or other damage occur to the conduit, the conduit could be replaced quickly and easily. If necessary, it would be even quicker to exchange the entire cooling-plate.

Cooling-plates, such as cooling-plates 100 and 102, may optionally be attached to any embodiment of slab-laser in accordance with the present invention. One or both plates may be advantageous, depending on the power applied to the gas-discharge and the efficiency of the slab-laser. Cooling-plate 100 will generally be most effective in conductively cooling the live electrode, because of a relatively short and unrestricted thermal path from the live electrode through the ceramic spacers and the extrusion.

Figure 6:
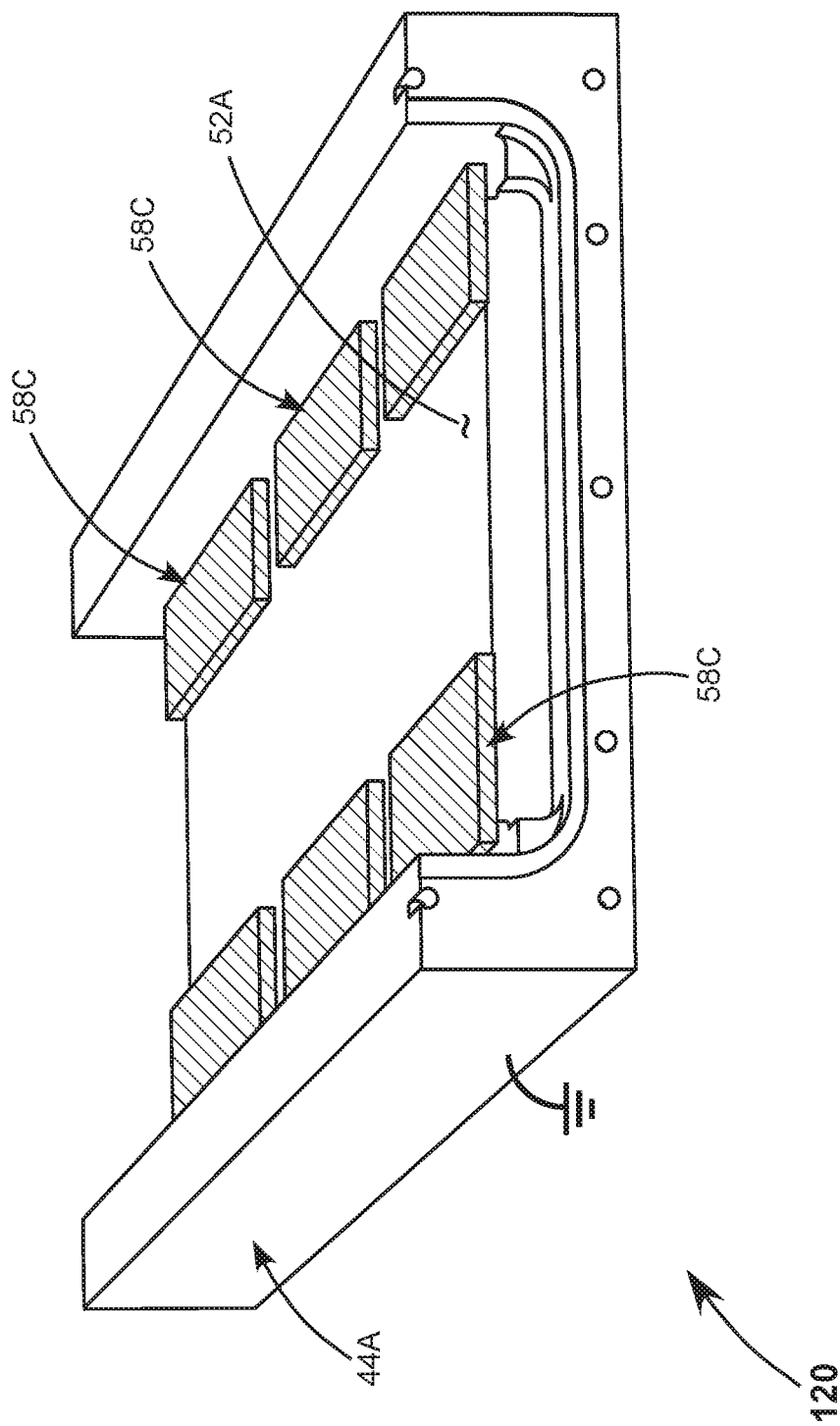
FIG. 6 is a perspective view, cut away, schematically illustrating still another preferred embodiment of a $CO_2$ slab-laser in accordance with the present invention, similar to the embodiment of FIG. 2, but wherein each elongated ceramic strip is formed by a plurality of ceramic segments.

FIG. 6 is a perspective view, cut away, schematically illustrating still another preferred embodiment 120 of a $CO_2$ slab-laser in accordance with the present invention. Laser 120 is similar to laser 40 of FIG. 2, except that each ceramic strip is formed by a plurality of ceramic segments 58C. In FIG. 6, live electrode 54A and all the elements above it have been omitted for clarity of illustration. Neighboring ceramic segments 58C are slightly separated from each other, the separation being small compared to the length of each ceramic segment 58C.

This segmented arrangement has advantages for making the ceramic strips less expensive to fabricate and to install within laser 120 and also for reducing acoustic noise. Acoustic noise, and vibrations in general, may cause noise in beam parameters of the output laser-radiation (for example, changes in beam pointing) and reduce the overall lifetime of the laser. To further reduce acoustic noise, all of the preferred embodiments of the present invention described herein avoid air-cooling means, which would include cooling fins that are in close thermal and therefore mechanical contact with one or both of the electrodes. Although identical ceramic segments are depicted in FIG. 6, the ceramic segments may also have different lengths to facilitate manufacture or to mitigate acoustic noise of laser 120. Ceramic member 82 of FIG. 3 and ceramic strips 58B of FIG. 4 may be similarly segmented to realize the same advantages.

It should be noted that while the present invention is described herein with reference to a $CO_2$ slab-laser having a $CO_2$ gas mixture, principles of the invention are equally applicable to a carbon monoxide (CO) slab-laser having a CO gas mixture. CO slab-lasers deliver output laser-radiation at wavelengths within a range from about 4.5 μm to about 6.0 μm. It should also be noted that while an object of the invention is to provide a laser for dental operations at a cost justifiable by a dental practitioner, lasers in accordance with the present invention may be useful in any other applications for which the price of a high-power prior-art slab-laser would be prohibitive.

In summary, the present invention is described above with reference to preferred embodiments. The invention is not limited, however, to the embodiments described herein. Rather, the invention is limited only by the claims, appended hereto.

What is claimed is:

1. A gas-discharge slab laser, comprising:
a laser-housing including an elongated unitary metal hollow extrusion having an interior planar surface forming a first planar electrode;
a second elongated planar electrode located within the hollow portion of the elongated extrusion, the second elongated planar electrode spaced-apart and parallel to the first elongated electrode, the spaced-apart first and second elongated planar electrodes defining a slab shaped discharge-gap of the slab laser, neither the elongated extrusion nor the second elongate electrode including any fluid coolant channels;
a pair of laterally spaced elongated ceramic strips located between the elongated planar electrodes for spacing apart the first and second elongated planar electrodes, and with the height of the ceramic strips defining the height of the discharge and with the ceramic strips being outside the central portion of the discharge area and with the ceramic strips providing a heat path from the second electrode to the extrusion for conductively cooling the second electrode;
a pair of resonator mirrors, one mirror located at one end of the elongated planar electrodes and the second mirror located at the other end of the elongated planar electrodes and wherein the spacing between the elongated planar electrodes defines a waveguide that constrains the laser radiation modes and wherein lateral spacing between the ceramic strips is sufficient so as not to constrain the laser radiation modes and the resonator mirrors define an unstable laser resonator in the axis transverse to the waveguide axis; and
a first fluid cooled plate attached to a first exterior surface of the elongated extrusion, adjacent the first planar electrode.

2. The slab laser as recited in claim 1 further including a second fluid-cooled plate attached to a second exterior surface of the elongated extrusion, which is on an opposite side of the elongated extrusion from the first exterior surface.

3. The slab laser as recited in claim 2 wherein each fluid cooled plate further includes a fluid conduit having a D-shaped cross-section pressed into a U-shaped groove formed in the fluid cooled plate.

4. The slab laser as recited in claim 3 wherein the conduit in each fluid cooled plate has a serpentine configuration.

5. The slab laser as recited in claim 1, wherein a separation between edges of the elongated ceramic strips defines a width of a discharge-volume.

6. The slab laser as recited in claim 1, further including a first pair of grooves in one of the first and second elongated planar electrodes, extending along the length thereof, the first pair of grooves mutually-separated and parallel to each other, the distance between edges of the first pair of grooves defining a width of a discharge-volume.

7. The slab laser as recited in claim 6, further including a second pair of grooves extending along the other of the first and second elongated planar electrodes and aligned with the first pair of grooves, the distance between edges of the second pair of grooves further defining a width of a discharge-volume.

8. The slab laser as recited in claim 1, wherein the slab laser is a carbon dioxide slab laser having a carbon dioxide gas mixture.

9. The slab laser as recited in claim 1, wherein the slab laser is a carbon monoxide laser having a carbon monoxide gas mixture.

10. The slab laser as recited in claim 1, wherein the elongated extrusion is made from aluminum.

11. The slab laser as recited in claim 1, wherein the ceramic strips are made from one of a group of ceramics consisting of aluminum nitride, aluminum oxide, and beryllium oxide.

12. The slab laser as recited in claim 1 wherein the ceramic strips are formed from a plurality of segments, said segments being completely separated from each other, with the separation being smaller than the length of each segment.

* * * * *